United States Patent
Comstock

(10) Patent No.: US 9,204,627 B1
(45) Date of Patent: Dec. 8, 2015

(54) ADJUSTABLE SWING BAR SYSTEM FOR BOX TRAPS

(76) Inventor: James Edward Comstock, Ganesvoort, NY (US)

( * ) Notice: Subject to any disclaimer, the term of this patent is extended or adjusted under 35 U.S.C. 154(b) by 731 days.

(21) Appl. No.: 13/134,765

(22) Filed: Jun. 16, 2011

Related U.S. Application Data

(60) Provisional application No. 61/398,134, filed on Jun. 21, 2010.

(51) Int. Cl.
*A01M 23/18* (2006.01)
*A01M 23/20* (2006.01)
*A01M 23/16* (2006.01)

(52) U.S. Cl.
CPC ............... *A01M 23/18* (2013.01); *A01M 23/16* (2013.01); *A01M 23/20* (2013.01)

(58) Field of Classification Search
CPC ...... A01M 23/16; A01M 23/18; A01M 23/20
USPC ........................................................ 43/60, 61
See application file for complete search history.

(56) References Cited

U.S. PATENT DOCUMENTS

| | | | | |
|---|---|---|---|---|
| 111,771 | A * | 2/1871 | Oliver | 43/61 |
| 146,887 | A * | 1/1874 | Doremus | 43/61 |
| 181,105 | A * | 8/1876 | Rice | 43/61 |
| 383,972 | A * | 6/1888 | Mittler | 43/61 |
| 1,130,667 | A * | 3/1915 | Carlson | 43/61 |
| 1,139,849 | A * | 5/1915 | Collins | 43/61 |
| 1,242,462 | A * | 10/1917 | Mester | 43/61 |
| 1,257,244 | A * | 2/1918 | Kaizumi | 43/61 |
| 1,305,054 | A * | 5/1919 | Blevins | 43/61 |
| 1,372,663 | A * | 3/1921 | Albers et al. | 43/61 |
| 1,444,934 | A * | 2/1923 | Miller | 43/61 |
| 1,516,388 | A * | 11/1924 | Kruszynski | 43/61 |
| 1,645,444 | A * | 10/1927 | Moore | 43/61 |
| 1,913,823 | A * | 6/1933 | Witte | 43/61 |
| 2,047,063 | A * | 7/1936 | Gephardt | 43/61 |
| 2,275,043 | A * | 3/1942 | Colwell et al. | 43/61 |
| 2,488,202 | A * | 11/1949 | Kern | 43/61 |
| 2,499,682 | A * | 3/1950 | Reeb | 43/61 |
| 2,540,418 | A * | 2/1951 | Bird | 43/61 |
| 2,544,026 | A * | 3/1951 | Kern et al. | 43/61 |
| 2,616,210 | A * | 11/1952 | Reeb | 43/61 |
| 2,725,661 | A * | 12/1955 | Bowman | 43/61 |
| 3,174,250 | A * | 3/1965 | Gilbert | 43/61 |
| 3,426,470 | A * | 2/1969 | Rudolph | 43/61 |

(Continued)

FOREIGN PATENT DOCUMENTS

| | | | | |
|---|---|---|---|---|
| CH | | 689089 A5 | 9/1998 | |
| DE | | 4136384 A1 * | 5/1992 | ............ A01M 23/18 |

(Continued)

*Primary Examiner* — Darren W Ark
(74) *Attorney, Agent, or Firm* — Schmeiser, Olsen & Watts, LLP

(57) ABSTRACT

This is a versatile, durable, practical box trap with an adjustable swing bar wire trigger system designed to live capture wildlife through the use of highly powered fast closing doors. It was engineered to address every known problem, circumstance and issue dealing with nuisance wildlife control. This produces a tool that anyone can use in virtually every circumstance with confidence. The combination of an adjustable variable wire triggering system with powered doors, as anticipated, has produced the most versatile live traps known. Not only are they the best trap available, but they are made to be affordable.

18 Claims, 4 Drawing Sheets

(56) References Cited

U.S. PATENT DOCUMENTS

| | | | |
|---|---|---|---|
| 4,546,568 A * | 10/1985 | Seyler | 43/61 |
| 4,590,704 A * | 5/1986 | Volk | 43/61 |
| 4,612,723 A * | 9/1986 | Reed | 43/61 |
| 4,706,406 A * | 11/1987 | Mowatt | A01M 23/18 43/61 |
| 4,899,484 A * | 2/1990 | Morin | 43/61 |
| 4,912,872 A * | 4/1990 | Wynn et al. | 43/61 |
| 5,329,723 A * | 7/1994 | Liul | 43/61 |
| 5,845,432 A * | 12/1998 | Tully et al. | 43/61 |
| 6,609,327 B2 * | 8/2003 | Stoico et al. | 43/61 |
| 6,618,982 B2 * | 9/2003 | Lafforthun | 43/61 |
| 7,370,451 B2 * | 5/2008 | Rich et al. | 43/61 |
| 7,596,902 B2 * | 10/2009 | Han et al. | 43/61 |
| 8,096,078 B2 * | 1/2012 | Watson | A01M 23/18 43/61 |
| 8,407,930 B2 * | 4/2013 | DeKalb | 43/61 |
| 8,646,204 B2 * | 2/2014 | Chiu | 43/61 |
| 2009/0094882 A1 * | 4/2009 | Comstock | 43/61 |
| 2011/0061288 A1 | 3/2011 | DeKalb | |
| 2011/0179693 A1 * | 7/2011 | Chiu | 43/61 |
| 2013/0025182 A1 * | 1/2013 | DeKalb | 43/61 |

FOREIGN PATENT DOCUMENTS

| | | | | |
|---|---|---|---|---|
| DE | 102007037275 A1 * | 2/2009 | | A01M 23/20 |
| EP | 0251903 A1 | 1/1988 | | |
| FR | 2558039 A3 | 7/1985 | | |
| FR | 2728141 A1 * | 6/1996 | | A01M 23/18 |
| FR | 2783399 A1 * | 3/2000 | | A01M 23/18 |
| GB | 2258381 A * | 2/1993 | | A01M 23/18 |
| JP | 08056549 A | 3/1996 | | |
| JP | 10215752 A | 8/1998 | | |
| WO | 9506406 A1 | 3/1995 | | |
| WO | WO 9506406 A1 * | 3/1995 | | A01M 23/18 |

\* cited by examiner

ADJUSTABLE SWING BAR SYSTEM FOR BOX TRAPS

CROSS-REFERENCE TO RELATED APPLICATION

This application claims the benefit of provisional patent application, Application No. 61/398,134, filed Jun. 21, 2010 by the present inventor.

BACKGROUND

Prior Art

The following is a tabulation of prior art that presently appears relevant:

| U.S. Patents | | |
|---|---|---|
| Pat. No. | Issue Date | Patentee |
| 3,174,250 | Mar. 23, 1965 | James K. Gilbert |

This application relates to an adjustable pressure swing bar wire trigger system for box traps.

Though cage type box traps have been available for quite some time, they all exhibit numerous limitations and shortcomings in function, durability and in usage. Some traps are limited to land use. Others that can be used in water may be used upright only. Cage traps with slow gravity operated doors or lightly powered doors allow for animals either to "beat" a door upon closure or to raise a door for escape. The use of highly powered doors in combination with an adjustable wire trigger allows for traps that not only fire quickly and decisively with different trigger pressures, but also means that traps can be made much shorter to accomplish the same goal as prior art, as much as fifty percent shorter. Powered door wire trigger traps can be set right side up, upside down, sideways and vertically, on land, in water and under water in any combination without modification. This versatility is not found in other traps. A trap with a rectangular door opening is essentially a trap of two sizes because they can be set in two ways, right side up or sideways.

Wire trigger mechanisms adapted from other traps do not have the option in spacing multiple trigger wires along a swing bar or enjoy the same degree in stability of the swing bar system. Due to the nature of the swing bar system the drop bar with sliding door hook provides for the option to alter the amount of pressure needed to fire the trap, light pressure for feral cats for instance. Conversely, the trap may be set on a heavy setting for vertical usage in a chimney for raccoon or even hung from a ceiling. With the combination of powered doors and variable wire trigger, unlike any other trap, beaver traps may not only be set under water, but will function when set upside down, actually better. Other box traps have the disadvantage of setting only right side up and on land.

The trip rod tab provides a means to regulate the amount of trigger travel required to fire the trap. A wide tab means the trigger will travel farther before the trap fires, thus allowing an animal to penetrate the catch box further so that a shorter trap can be used, an option not found in prior art.

Triggers on other traps when moved become delicate, "touchy." On this embodiment there is a wide tab engaging a post. The trigger may be moved, even inches, without effecting the stability in the triggering mechanism, which will remain solid and intact, ready to function.

Though older traps may have "worked," they usually required continuous maintenance. Unlike most other traps, these traps can be made with little to break, with far less vulnerability to damage, except that soft trigger wires can be easily bent back into shape after a catch is made. All parts are internal. There is nothing to snag or break protruding from the trap surface as in prior art.

SUMMARY

This is an adjustable pressure, wire trigger system for a box cage trap that works with powered doors to produce a fast, durable and versatile live cage trap.

Advantages

Accordingly several advantages of one or more aspects are as follows: the configuration of the trigger system working in harmony with the powered doors, unlike any other prior art, allows for the box trap to be set in any position, upside down, sideways, right side up or vertically. The trigger system also provides for the box trap to be set in any condition, on land, in water, or underwater. The adjustability in the swing bar trigger pressure affords the opportunity for lighter or heavier pressure for the trigger setting as needed for different species or circumstance, unlike prior art. The union of the power spring door and the trigger comprises the unique system that offers distinct advantages over prior art.

DRAWINGS

Figures

In the drawings, closely related figures have the same number.

DRAWINGS

Figure 1:
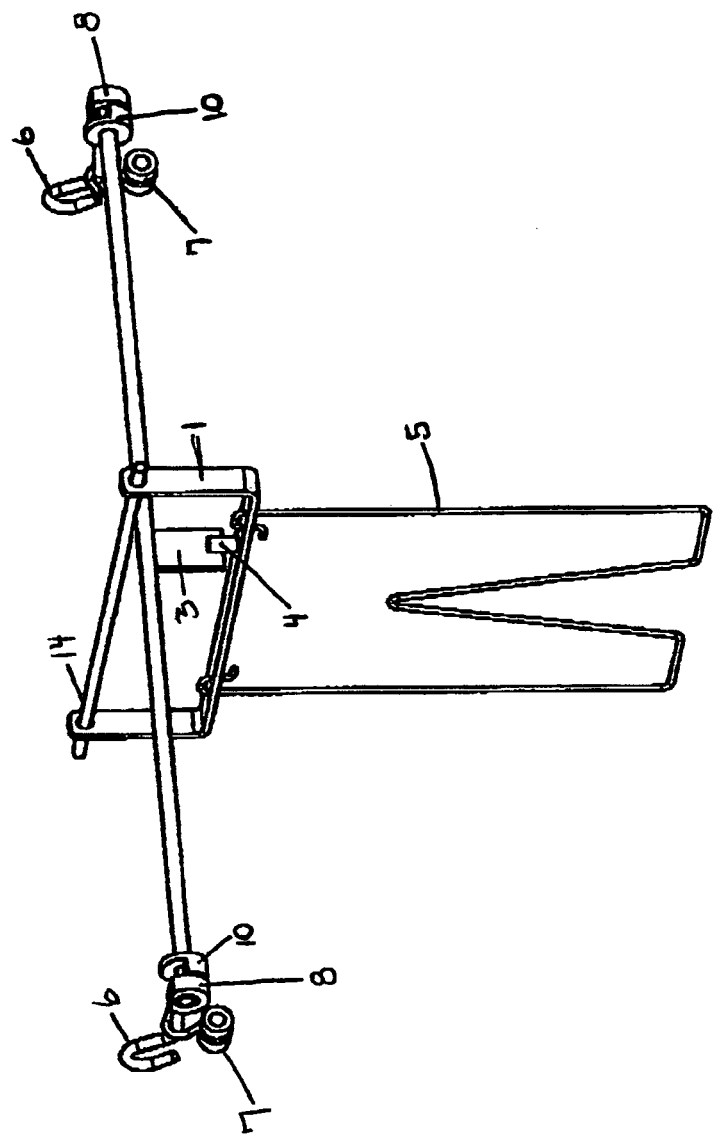
FIG. 1 shows the swing bar system with swing bar and post, trip rod and tab, drop bar and door hook.

Reference Numerals 1 swing bar
2 trip rod
3 trip rod tab
4 swing bar post
5 trigger wires
6 door drop rod
7 door hook
8 trip rod bushing
9 door lock bar
10 drop rod slotted bushing
11 door springs
12 lock bar springs
13 lock bar stops
14 swing bar hanging rod
15 door hook slide rod

DETAILED DESCRIPTION

Figure 2:
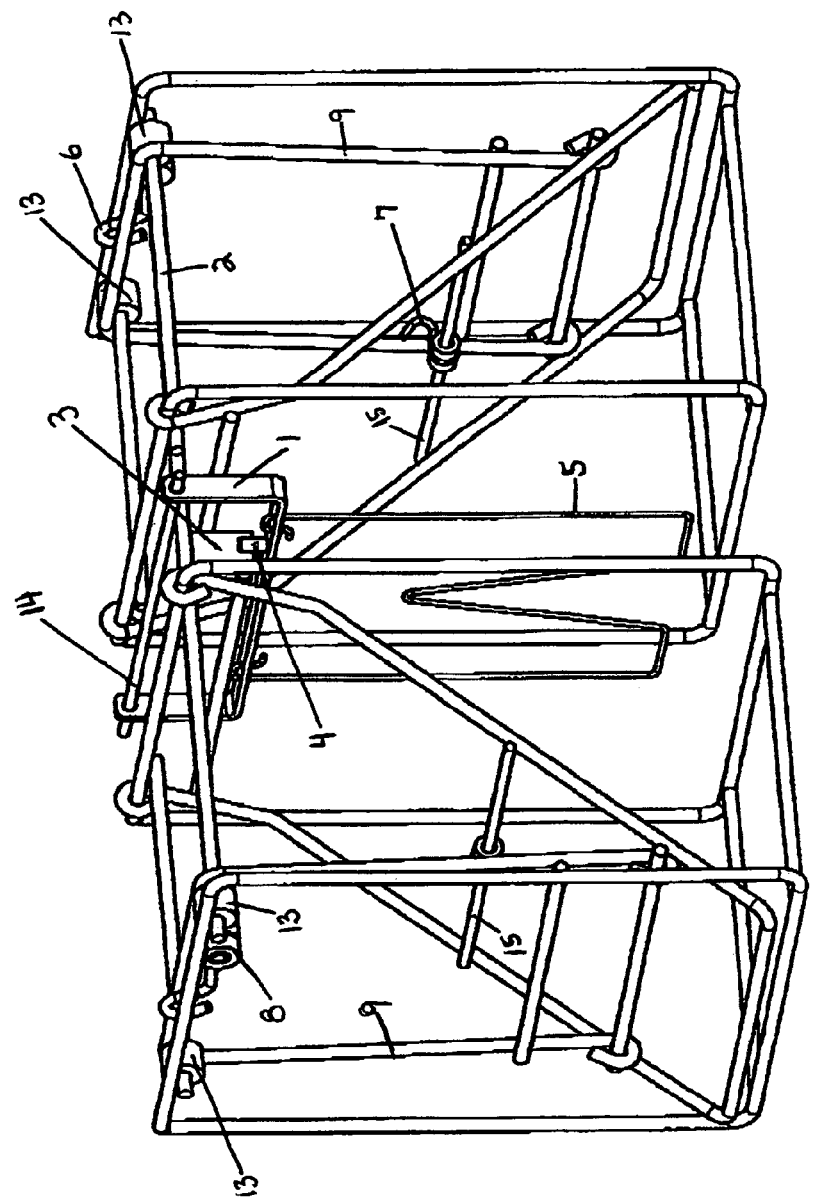
FIG. 2 shows the box trap swing bar trigger system mounted in the frame with the lock bars and doors in the closed position.
Figure 3:
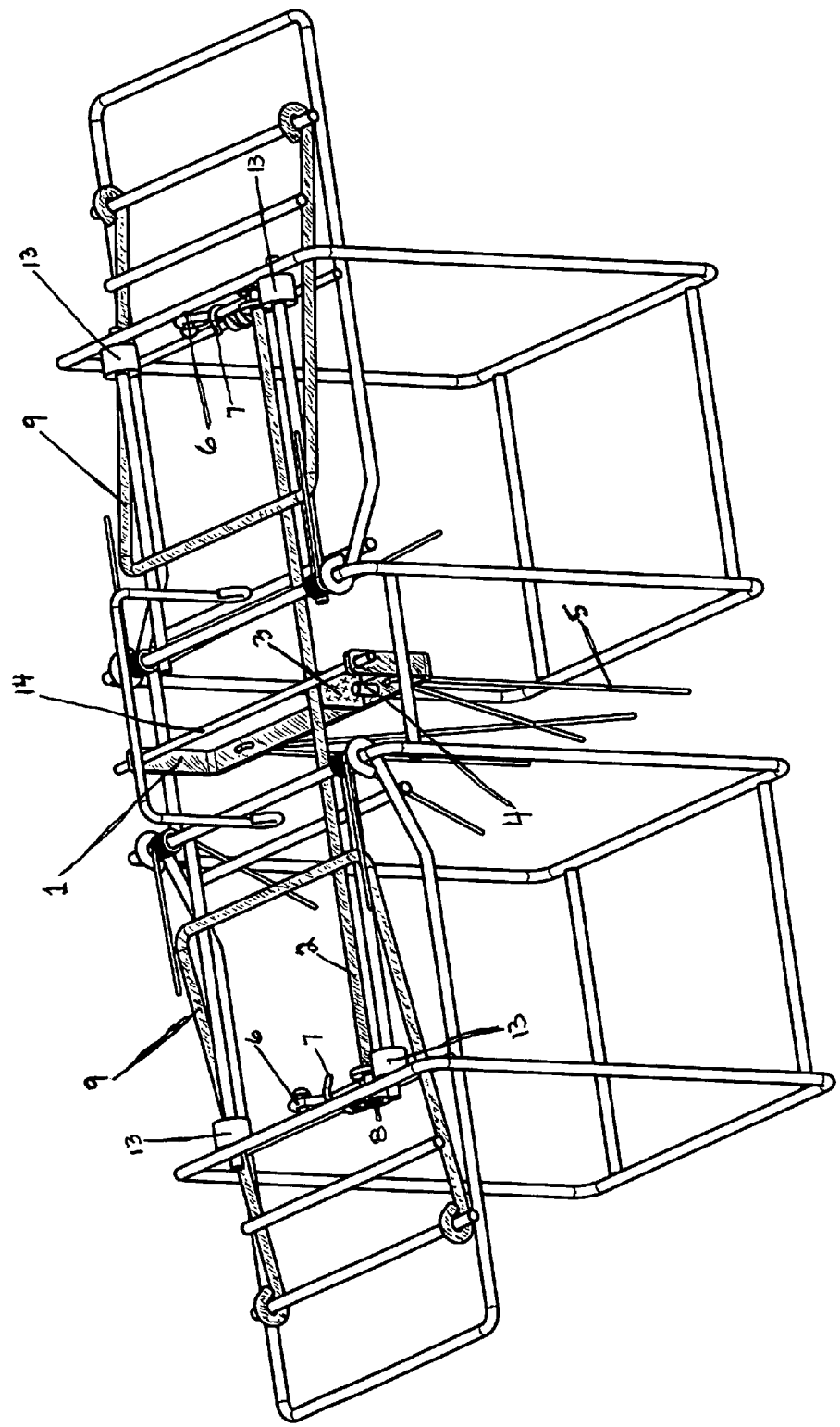
FIG. 3 shows the box trap swing bar trigger system mounted in the frame with the lock bars and doors in the open position.

FIGS. 1,2,3, and, 4—First Embodiment

In FIG. 1 the swing bar 1 hangs from the swing bar hanging rod 14 from the top of the trap. The trigger wire 5 is inserted into holes in the swing bar 1. Swing bar post 4 engages the trip rod tab 3 in the set position. The trip rod 2 rests in the trip rod bushing 8 at either end of the trap frame. The end of the door drop rod 6 seats on the drop bar slotted bushing 10 which is welded to the trip rod 2. The door hook 7 hooks onto the door drop rod 6 and holds the door in the up or set position.

In FIGS. 2 and 3, hinged at the bottom of the door, door lock bar 9 rests up against the lock bar stops 13. The door hook slide rod 15 carries the door hook 7.

Figure 4:
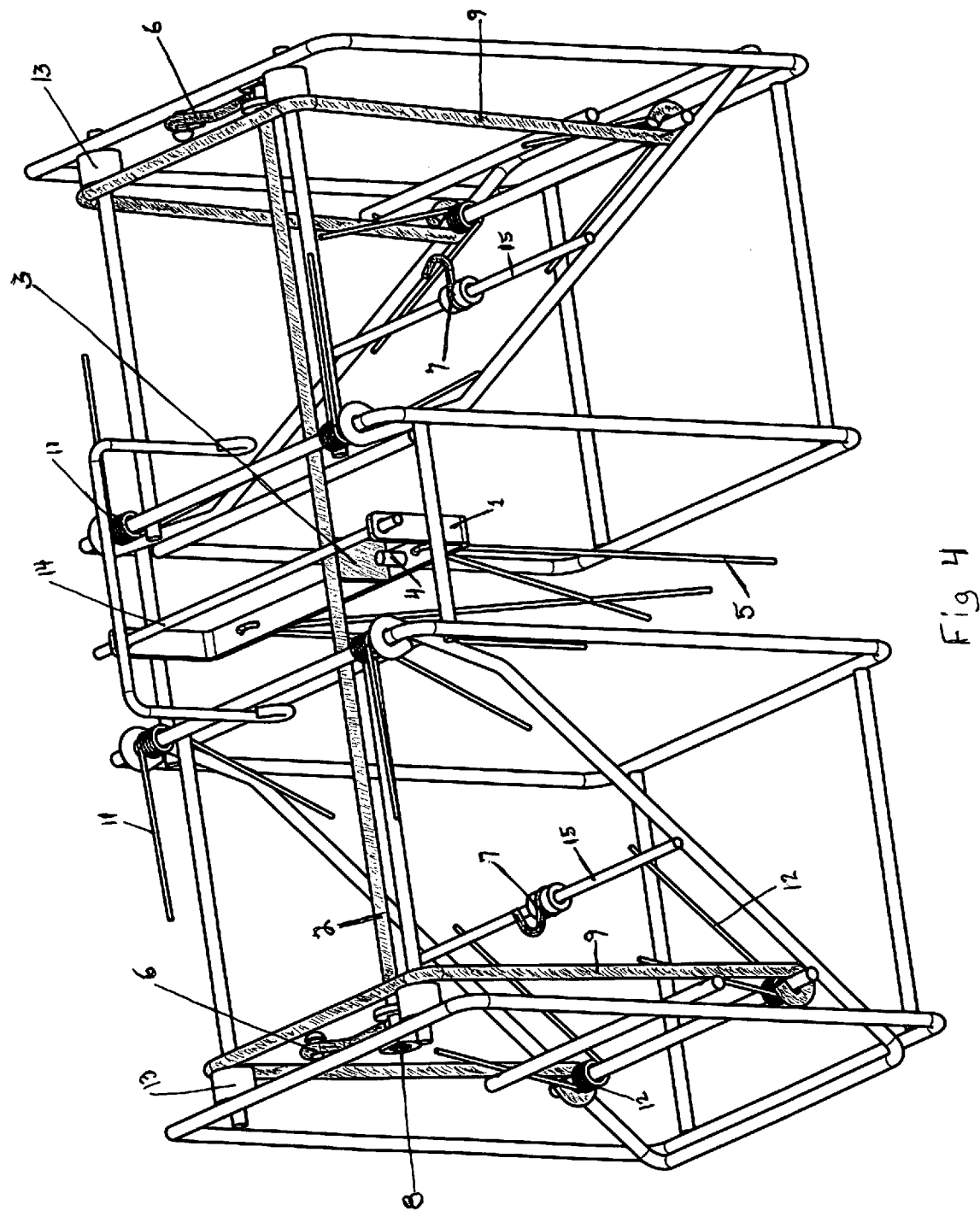
FIG. 4 show the box trap swing bar system, with springs mounted in position.

FIG. 4 shows two door springs 11 at the top of each door. Lock bar springs 12 assists the lock bar 9 into closing and securing the cage trap door.

Operation—FIGS. 1,2,3, and 4

Spring power derived from the combination of the lock bar springs 12 and door springs 11 working in tandem to close and lock the doors, provide the necessary resistance on the swing bar 1 and trip rod 2 to maintain stability when the trap is in the set position FIG. 3.

In sequence, first situate the trip rod tab 3 behind the swing bar post 4 at the center of the trap so that the tab 3 is on the side of the post 4 towards center. Next place the end of the door drop rod 6 into the drop rod slotted bushing 10 on each door. Simultaneously push in the top of the lock bar 9 towards the center of the trap while lifting the door at the bottom. Continue until the door is horizontal. Latch the door hook 7 onto the door drop rod 6. Placing the door hook 7 nearest the trip rod 2 will provide the greatest pressure on the triggering and conversely placing the door hook 7 farthest from the trip rod 2 will provide the least amount of pressure on the trigger.

To actuate the trigger the swing bar trigger wires 5 may be pushed forward or backward in either direction. As the swing bar post 4 is moved past the trip rod tab 3, the tab flips up due to the pressure of the door hooks 7 on the door hook drop bar 6. As the trip rod 2 rotates so to does the slotted drop rod door bushing 10. The bushing moves from horizontal to vertical thus releasing the door drop rod 6 and the door hook 7. The door slams shut capturing the animal alive.

The extreme power source, approximately nine pounds on each door when measured at the end of the doors in the set position, enables the trap to be set and used in all positions and conditions exhibiting outstanding stability while working with gravity, neutral to gravity or even opposing gravity. With this system an animal can walk, swim, crawl or even fly through a trap to actuate the trigger, resulting in capture.

Advantages

From the description above, a number of advantages of some embodiments of my adjustable swing bar trigger system for box traps become evident:

a. Box traps can be set in any position, right side up, up side down, sideways, and vertically.
b. Box traps can be set on land, underwater, and in water.
c. The box trap trigger can be set lightly for smaller, lighter animals and can be set on a heavier setting for larger animals and in the vertical position.
d. The amount of trigger travel can be altered in the selection in the width of the material used for the trip rod tab. This also provides opportunity for clip on wider trip rod tabs to extend trigger travel and allow animals to penetrate the catch box compartment deeper before the trigger fires and doors close.
e. Wire triggers reduce the chance of animals reaching in for bait over pan type traps or stepping over the pan and passing through the trap without actuating the trigger.
f. With an elongated swing bar, multiple holes may be drilled in the swing bar for additional trigger wires to make passing through the box trap without actuating the trigger by an animal a virtual impossibility.
g. With a swing bar system, trigger wires may me changed or altered simply by drilling smaller or larger diameter holes in the swing bar.
h. Swing bar trigger wires may be changed without the use of tools simply by dropping in a new trigger wire.
i. Virtually any small diameter wire may be used to replace a trigger wire, negating the necessity to buy only factory made trigger wires.
j. While setting, the box trap exhibits greater stability than any other box trap. Though the trap may be actuated with ease by an animal, simple jarring or rolling over will not cause the cage to actuate prematurely in most cases.
k. Since the swing bar post rests on a wide tab, even if the trigger is moved from center, the stability in the trigger is not compromised but rather remains intact and stable showing no evidence of what would be termed a "hair trigger" in other wire trigger mechanism adapted from other traps.
l. When using the larger beaver traps, when compared to some existing well known dangerous models, these traps are incredibly safe to use around pets and children.
m. The traps are made to be light in weight, but durable.
n. This trigger system is designed to be used with double door traps, with both doors dropping together since a single rod is used to release both doors, no staggered or hang firing.
o. If only single door use is desired with bait, the trap will operate in the same manner, the second door essentially doubling as a bait door.

CONCLUSION, RAMIFICATION, AND SCOPE

Accordingly, the reader will see that the adjustable swing bar trigger system for box traps can be used to improve live animal catches. The adjustable swing bar system allows for variability in trigger pressure allowing the user to regulate the animal size catch. The combined power triggering gives unsurpassed stability when setting the box trap in various outdoor or indoor settings opening up the possibilities to the user. The need for bait is eliminated due to the walkthrough nature of the wire triggers and double door setup. The triggering system easily captures animals moving quickly through the cage, even running. Furthermore, the adjustable swing bar system can be made without expensive dyes for manufacturing allowing marketing of a more affordable box trap. This box trap can replace many expensive specialty box traps having but one use due to its versatility, allowing the owner to buy one multi purpose cage.

Although the description above contains many specificities, these should not be construed as limiting the scope of the embodiments but as merely providing illustrations of some of several embodiments. For example, the box trap can be hung from a ceiling, placed in a chimney, and set upside down in a stream. The shape and sizes of the box trap with the adjustable swing bar trigger can be varied.

Thus the scope of the embodiments should be determined by the appended claims and their legal equivalents, rather than the examples given.

I claim:

1. An animal trap comprising:
   a swing bar pivotally mounted to the animal trap, the swing bar comprising two upright members extending into an interior of the animal trap and a transverse member connecting the upright members, the swing bar also having a swing bar post projecting from the transverse member;
   a trigger connected to the swing bar and extending into the animal trap;
   an elongated trip rod operatively connected to and extending from a first trap door mechanism located at a first end of the trap to a second trap door mechanism located at a second end of the trap, the first and second trap door mechanisms each comprising a trap door release mechanism; and
   a trip rod projection extending from the elongated trip rod, the trip rod projection positioned to engage the swing bar post such that, before a deflection of the trigger and activating of the trap door mechanisms, the swing bar post obstructs any upward rotational movement by the trip rod projection or the elongated trip rod around a longitudinal axis of the elongated trip rod;
   wherein, when the trigger is deflected by an animal, the deflection of the trigger rotates the swing bar wherein the swing bar post disengages the trip rod projection allowing the trip rod projection and the elongated trip rod to rotate upwardly around the longitudinal axis of the elongated trip rod and activate the trap door release mechanisms.

2. The animal trap as recited in claim 1, wherein the trip rod projection comprises a width wider than a width of the swing bar post and allows for some rotational movement of the swing bar and swing bar post without activation of the trap door release mechanisms.

3. The animal trap as recited in claim 1, wherein the trap door mechanisms provides resistance to movement of the swing bar and trip rod.

4. The animal trap as recited in claim 1, wherein the trigger comprises multiple trigger wires mounted to the swing bar and extending into the animal trap.

5. The animal trap as recited in claim 1, wherein the swing bar, swing bar post, trigger, elongated trip rod, and trip rod projection are adapted to provide variable trigger pressure.

6. The animal trap as recited in claim 1, wherein the trap door release mechanisms comprise a slidable door hooks.

7. The animal trap as recited in claim 6, wherein the slidable door hooks are adapted to vary trigger pressure.

8. The animal trap as recited in claim 1, wherein the trap door release mechanisms comprise at least one of a powered door release mechanism, a swing door release mechanism, a guillotine door release mechanism, and a ring door release mechanism.

9. The animal trap as recited in claim 1, wherein the trap door release mechanisms comprise a powered door release mechanism.

10. The animal trap as recited in claim 1, wherein the swing bar, swing bar post, trigger, elongated trip rod, and trip rod projection are adapted for use in any position.

11. The animal trap as recited in claim 10, wherein any position comprises at least one of upside down, sideways, right side up, and vertically.

12. The animal trap as recited in claim 1, wherein the swing bar, swing bar post, trigger, elongated trip rod, and trip rod projection are adapted for use in any one of on land, in water, and underwater.

13. The animal trap as recited in claim 1, wherein the trigger is adapted to deflect forward and backward.

14. The animal trap of claim 1, further comprising:
    wherein the first and second trap doors are held in an open position by first and second door drop rods attached to the elongated trip rod;
    wherein the first and second door drop rods are positioned so that they are not in alignment with the first and second trip rod projections; and
    wherein, when the swing bar post disengages the third trip rod projection, the third trip rod projection rotates in an upward fashion while the door drop rods rotate in a downward fashion.

15. The animal trap of claim 1, wherein the trigger, swing bar, and swing bar projection extending in substantially the same plane such that all elements move and rotate in the same plane.

16. An animal trap comprising:
    a first trap door located at a first end of the animal trap;
    a first door spring operatively attached to the first trap door configured to bias the first trap door in a closed door direction;
    a second trap door located at a second end of the animal trap;
    a second door spring operatively attached to the second trap door configured to bias the second trap door in a closed door direction;
    a deflectable trigger extending into the animal trap;
    the deflectable trigger attached to a swing bar which has a swing bar projection;
    an elongated trip rod extending between each of the first trap door and the second trap door;
    a first trip rod projection extending from a first end of the elongated trip rod;
    a second trip rod projection extending from a second end of the elongated trip rod at the same angle and in the same orientation as the first trip rod projection; and
    a third trip rod projection extending from the elongated trip rod at a different angle than the first and second trip rod projections and into the interior of the cage;
    wherein the first trap door is held in an open position by the first trip rod projection such that the first trap door exerts a bias from the first door spring against the first trip rod projection causing a torque on the elongated trip rod in a first direction;
    wherein the second trap door is held in an open position by the second trip rod projection such that the second trap door exerts a bias from the second door spring against the second trip rod projection causing a torque on the elongated trip rod in the first direction;
    wherein the torque on the elongated trip rod in the first direction causes the first and second trip rod projections to be biased to rotate in a downward direction while the torque on the elongated trip rod in the first direction causes the third trip rod projection to be biased to rotate in an upward direction;
    wherein the elongated trip rod is prevented from rotating in the first direction by the swing bar projection attached to the swing bar and the trigger, when the trigger resides in a first position, wherein the elongated trip rod is allowed to rotate in the first direction when the deflectable trigger is deflected into a second position by an animal.

17. The animal trap of claim 16, wherein the deflectable trigger, swing bar, swing bar projection, elongated trip rod, and the trip rod projections may be set and activated when the trap is in any position, including right-side up, upside down, sideways, or any other position.

18. The animal trap of claim 16, wherein the deflectable trigger is a wire trigger.

\* \* \* \* \*